(12) United States Patent
Kim et al.

(10) Patent No.: US 6,972,108 B2
(45) Date of Patent: Dec. 6, 2005

(54) DEVICE FOR METALLIZING URANIUM OXIDE AND RECOVERING URANIUM

(75) Inventors: Ik-Soo Kim, Daejeon (KR);
Chung-Seok Seo, Daejeon (KR);
Sun-Seok Hong, Daejeon (KR);
Won-Kyoung Lee, Daejeon (KR);
Dae-Seung Kang, Daejeon (KR);
Seong-Won Park, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 183 days.

(21) Appl. No.: 10/631,438

(22) Filed: Jul. 30, 2003

(65) Prior Publication Data

US 2005/0072271 A1 Apr. 7, 2005

(30) Foreign Application Priority Data

Mar. 19, 2003 (KR) ...................... 10-2003-0017140

(51) Int. Cl.[7] ............................................ G21C 19/44
(52) U.S. Cl. ........................ 266/176; 266/905; 75/393
(58) Field of Search ................................ 266/171–195, 266/242, 900–905; 75/398, 399

(56) References Cited

U.S. PATENT DOCUMENTS

| | | | | |
|---|---|---|---|---|
| 2,756,138 A | * | 7/1956 | Meister | ........................ 75/398 |
| 2,787,536 A | * | 4/1957 | Spedding et al. | .............. 75/398 |
| 2,847,297 A | * | 8/1958 | di Pietro | ...................... 266/905 |
| 2,960,398 A | * | 11/1960 | Leaders et al. | .............. 266/905 |
| 5,164,050 A | | 11/1992 | Bertaud et al. | |
| 5,421,855 A | | 6/1995 | Hayden, Jr. et al. | |

* cited by examiner

Primary Examiner—Scott Kastler
(74) Attorney, Agent, or Firm—Bachman & LaPointe, P.C.

(57) ABSTRACT

Disclosed is a device for metallizing uranium oxide and recovering uranium, which reacts uranium oxide with a lithium metal to product uranium metal powder, and filters the resulting product using a porous filter to separate the uranium metal powder from lithium chloride molten liquid to recover the uranium metal powder. The device includes a heating furnace including at least one first heating unit, and a reactor includes a reaction vessel having a discharging valve hole located at the center of a bottom thereof and a conical bottom tapered to the discharging valve hole, a sealing lid for sealing the reaction vessel airtight, an argon gas inlet port for feeding argon gas into the reactor therethrough, and an argon gas outlet port for venting argon gas from the reactor therethrough. A valve assembly controls the discharging valve hole of the reaction vessel, and a plurality of agitators mix a mixture in the reactor. A lithium metal feeder includes a second heating unit and is removably installed through the sealing lid. A cooling jacket is set in the sealing lid, and a porous filter is located under the reactor in the heating furnace. Further, a molten salt recovery tank is positioned under the porous filter in the heating furnace.

7 Claims, 1 Drawing Sheet

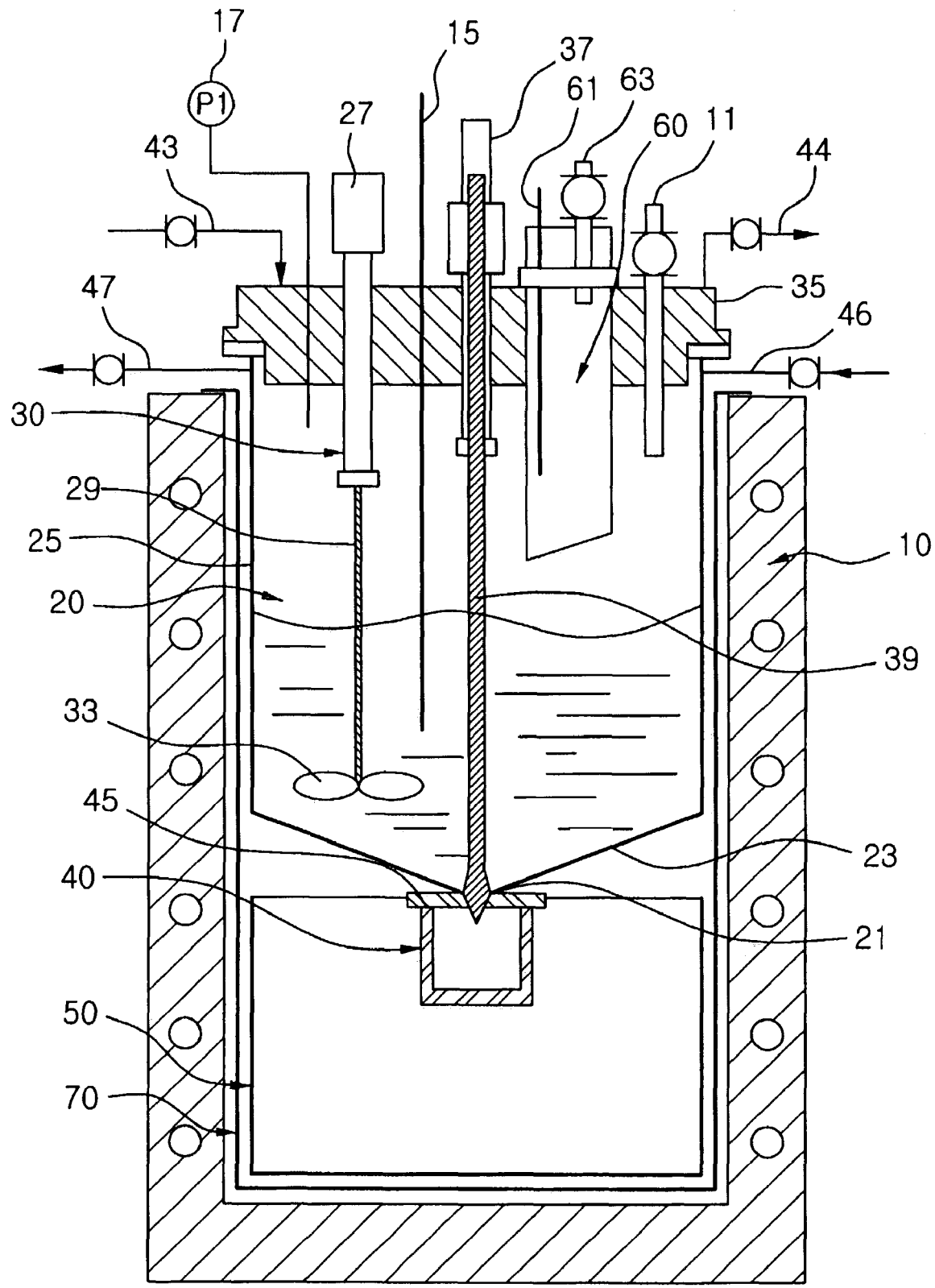
--Fig. 1--

DEVICE FOR METALLIZING URANIUM OXIDE AND RECOVERING URANIUM

BACKGROUND OF THE INVENTION

1. Field of the Invention

The present invention pertains, in general, to a device for metallizing uranium oxide and recovering uranium by filtration and, in particular, to a device for metallizing uranium oxide and recovering uranium, in which uranium oxide reacts with a lithium metal to produce a uranium metal powder, and filters the resulting product using a porous filter to separate the uranium metal powder from lithium chloride molten liquid to recover the uranium metal powder.

2. Description of the Related Art

As well known to those skilled in the art, spent nuclear fuel discharged from a nuclear power plant and a laboratory atomic reactor contains great quantities of uranium oxide. Practically, the spent nuclear fuel mostly consists of uranium oxide. Accordingly, a technology of reducing uranium oxide to a uranium metal is being monitored with keen interest, and various technologies have been developed to reduce uranium oxide to uranium.

For example, a process of reducing uranium oxide to uranium was proposed, in which uranium oxide reacts with hydrofluoric acid to produce uranium tetrafluoride ($UF_4$) The uranium tetrafluoride thus produced is reduced by magnesium or calcium to produce uranium.

However, the above process is disadvantageous in that fluorine used as a reactant is strongly corrosive and has handling difficulties. Other disadvantages include difficulties in treating magnesium fluoride ($MgF_2$) and calcium fluoride ($CaF_2$) acting as side-products, because they are mixed with uranium, thus reducing process efficiency and securing insufficient competitiveness in terms of treatment cost of the side-products.

To avoid the above disadvantages, another process was suggested to reduce uranium oxide to uranium, in which uranium oxide is converted to uranium chloride acting as an intermediate. The uranium chloride is then converted to uranium.

For example, U.S. Pat. No. 5,164,050 discloses a process of producing a uranium metal, in which uranium trioxide, instead of hydrofluoric acid, is reduced by hydrogen to uranium dioxide, and uranium dioxide is mixed with carbon powder. The resulting mixture reacts with chlorine gas in a fluidized reactor at 600° C. or higher to produce uranium tetrachloride ($UCl_4$), and uranium tetrachloride is electrolyzed to precipitate a uranium metal on a cathode.

Another example is disclosed in U.S. Pat. No. 5,421,855, in which a mixture of uranium dioxide and carbon is discharged into a reactor at 600° C. or higher while chlorine gas is injected into the reactor to produce uranium tetrachloride, and a uranium metal is produced from uranium tetrachloride using another metal.

Recently, a process of metallizing uranium oxide is used, in which uranium oxide powder reacts with a molten lithium metal using a lithium chloride molten salt acting as a reaction medium to produce a uranium metal. However, this process has disadvantages of particular operating conditions, such as a high temperature and difficulty in handling the molten salt acting as the reaction medium. In other words, the process using the molten salt is disadvantageous in that the process must be conducted in an inert atmosphere so as to prevent the molten salt from absorbing moisture in the atmosphere and conducted over a melting point of the molten salt so as to prevent the molten salt from being solidified under the melting point.

In detail, the process must be conducted in an airtight space under the inert atmosphere because the lithium metal is explosively oxidized with oxygen or moisture in the air, and the metallization must be conducted at 650° C. or higher temperature(over the melting point of lithium chloride). Additionally, the uranium metal powder must be separated from the lithium chloride molten salt acting as the reaction medium at a high temperature, that is, over the melting point of lithium chloride.

According to a conventional technology of reducing uranium oxide to uranium using lithium, $UO_2$ pellets as uranium oxide react with lithium to produce a uranium metal. However, this technology has disadvantages in that it takes a relatively long time to desirably react uranium oxide with lithium because of use of the pellets with a relatively small surface area. Further, the conversion efficiency of uranium oxide is relatively low. Other disadvantages are that reaction impurities, such as lithium chloride and lithium oxide, remain in the pores of the uranium metal because fine pores exist in the $UO_2$ pellets.

Meanwhile, a process of reducing uranium oxide to uranium is provided, in which uranium oxide powder ($UO_2$ or $U_3O_8$ powder) with a large surface area is used so as to shorten reduction time and avoid undesirable influence of the fine pores. However, this process is disadvantageous in that it is difficult to separate a uranium metal from a high temperature molten salt because the uranium metal forms fine powder. The uranium metal powder may be separated from the molten salt using a centrifugal separator so as to avoid the above disadvantage, but the centrifugal separator is not commercially useful to be applied to a high temperature, solid-liquid molten salt mixture. Thus, use of the centrifugal separator is insufficiently competitive in terms of commercialization.

Accordingly, powdered uranium oxide with a large surface area may be used so as to shorten the time required to react uranium oxide with lithium. However, the resulting uranium metal is produced in a shape of powder. Therefore, use of powdered uranium oxide cannot be commercialized without overcoming the difficulty in separating uranium metal powder from a high temperature molten salt.

SUMMARY OF THE INVENTION

Therefore, the present invention has been made keeping in mind the above problems occurring in the prior art, and an object of the present invention is to provide a device for reacting uranium oxide powder with molten lithium to produce uranium metal powder in an airtight space under an inert atmosphere using a lithium chloride molten salt acting as a reaction medium, and for directly filtering the resulting product to separate the fine uranium metal powder from the lithium chloride molten salt.

Based on the present invention, the above object can be accomplished by providing a device for metallizing uranium oxide and recovering uranium, including a heating furnace including first heating units for allowing the heating furnace to be maintained at a high temperature. The device also includes a reactor including a reaction vessel having an discharging valve hole located at the center of a bottom thereof and a conical bottom tapered to the discharging valve hole, a sealing lid for airtight the reaction vessel, an argon gas inlet port for feeding argon gas into the reactor therethrough, and an argon gas outlet port for venting argon gas from the reactor therethrough. A valve assembly controls the discharging valve hole of the reaction vessel, and a plurality of agitators uniformly mix a mixture in the reactor. A lithium metal feeder includes a second heating unit and is removably installed through the sealing lid to feed molten lithium metal into the reactor. Furthermore, a cooling jacket is set in the sealing lid to allow compressed air to continuously flow therethrough to intercept heat from the reactor. A porous filter is located under the reactor in the heating furnace to filter the resulting product discharged from the reactor. Moreover, a molten salt recovery tank is positioned under the porous filter in the heating furnace to collect molten salt passing through the porous filter.

The heating furnace includes therein a plurality of first heating units independently controlled in terms of temperature and vertically spaced apart from each other at predetermined intervals. Additionally, the porous filter is made of magnesia to filter fine uranium metal powder discharged from the reactor. As well, the valve assembly comprises a pneumatic cylinder actuator provided at the sealing lid and a rod-shaped valve connected to an output end of the pneumatic cylinder actuator to control the discharging valve hole.

The agitators comprise two agitators located at diametrically opposite sides around the center of the reactor, and each of the agitators comprises a magnetic drive unit, a motor positioned outside the reactor, and a drive shaft positioned in the reactor. In this regard, the magnetic drive unit transports power from the motor to the drive shaft while airtightly sealing the reactor.

The device also includes a sub-tank located between an inner surface of the heating furnace and outer surfaces of the reactor and molten salt recovery tank.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates a device for metallizing uranium oxide and recovering uranium according to the present invention.

DETAILED DESCRIPTION OF THE INVENTION

Reference now should be made to the drawing.

With reference to FIG. 1, the device includes a heating furnace 10, a reactor 20 installed at an upper part of the heating furnace 10, a porous filter 40 installed under the reactor 20 to filter a mixture discharged from the reactor 20, and a molten salt recovery tank 50 installed under the porous filter 40 to collect a molten salt passing through the porous filter 40. At this time, the heating furnace 10 functions to maintain the reactor 20, the filter 40, and the molten salt recovery tank 50 at a relatively high temperature.

The heating furnace 10 has an inner cylindrical space receiving the reactor 20, the porous filter 40, and the molten salt recovery tank 50, and functions to maintain the reactor 20, the filter 40, and the tank 50 at a desired temperature. In this regard, a plurality of first heating units (not shown) capable of independently controlling temperatures of the reactor 20, the filter 40, and the tank 50 are installed in the heating furnace 10 at predetermined intervals. For example, temperatures of the three first heating units installed at an upper, a middle, and a lower part of the heating furnace are independently controlled according to a PID (proportional-integral-derivative) control method, thereby reducing a temperature gradient of the heating furnace 10 to uniformly maintain a temperature of the heating furnace 10 and maintaining the inner cylindrical space of the heating furnace 10 at a temperature sufficient to melt lithium chloride acting as the reaction medium. That is to say, the reactor 20, the filter 40, and the tank 50 are maintained at a constant temperature about 650° C. so as to maintain lithium chloride in a molten state during metallizing uranium oxide and filtering uranium mixed with impurities.

Additionally, the reactor 20 in which uranium oxide is reduced by lithium while a reaction temperature is constantly maintained at a desired temperature by the heating furnace 10 includes a reaction vessel 25 receiving uranium oxide and a molten mixture of lithium chloride and lithium acting as the reaction medium, and a sealing lid 35 for covering an upper part of the reaction vessel 25 to seal the reaction vessel 25. Alternatively, the reactor 20 may form a pressure tank including the reaction vessel 25 integrated with the sealing lid 35.

Furthermore, the reaction vessel 25 includes a discharging valve hole 21 positioned at the center of a bottom thereof to discharge the resulting product to the porous filter 40, and a conical bottom 23 for a smooth discharge of the product to the porous filter 40. In this regard, it is preferable that the conical bottom 23 of the reaction vessel 25 has a decline at an angle of 35° or more.

Further, a plurality of agitators 30 are installed in the reactor 20 to uniformly agitate a solid-liquid mixture in the reaction vessel 25. The mixture of uranium oxide, lithium chloride, and lithium molten salt acting as reactants exists in a three phase of solid-liquid-liquid, and density differences between these reactants are very large. Thus, the agitators 30 must be installed in the reactor 20 in order to desirably mix them to improve reaction efficiency.

If a drive shaft 29 connected to the agitator is directly installed through the sealing lid 35, atmospheric air may flow through an interval between the drive shaft and the sealing lid 35 into the reactor 20. Accordingly, each of the agitators 31 according to the present invention includes a motor (not shown) located outside of the reactor 20, a drive shaft 29 positioned in the reaction vessel 25, an magnetic drive unit 27 installed through the airtight sealing lid 35 to supply power from the motor to the drive shaft 29, and a propeller 33 set at an end of the drive shaft 29 and dipped in a reactant mixture. The magnetic drive unit 27 may be directly connected to the motor (not shown), or may be connected through a flexible joint (not shown) to the motor in consideration of convenience during the connection of the motor to the reactor.

Furthermore, it is preferable that a pair of agitators 30 are located at diametrically opposite sides in the reactor 20 so as to avoid a vortex of the reactant mixture during rotation of the agitators 30.

The discharging valve hole 21 of the reaction vessel 25 is controlled by a valve assembly including a pneumatic cylinder actuator 37 and a rod-shaped valve 39. The pneumatic cylinder actuator 37 is located through the sealing lid 35 and outside the reactor 20, and the valve 39 is set at an output end of the pneumatic cylinder actuator 37 in such a way that the valve 39 is positioned through the sealing lid 35. Accordingly, the discharging valve hole 21 of the reaction vessel 25 is controlled by a bottom end of the valve 39 when the valve 39 vertically ascends or descends.

A cooling jacket (not shown) is installed in the sealing lid 35, and compressed air is continuously fed through a cooling jacket inlet 43 and discharged through a cooling jacket outlet 44. Thus, compressed air continuously flows throughout the sealing lid 35, thereby intercepting heat from the reactor 20. Hence, various instruments positioned on the sealing lid 35 and workers are shielded from heat emitted from the high temperature reactor 20.

Moreover, an argon gas inlet port 46 and an argon gas outlet port 47 are set at the reactor 20. Accordingly, argon gas continuously flows through the argon gas inlet and outlet ports 46 and 47 to allow pressure in the reactor 20 to be higher than atmospheric pressure, thereby maintaining the inside of the reactor under an inert atmosphere.

Meanwhile, a lithium metal feeder 60 is removably installed through the sealing lid 35 to airtightly feed lithium (Li) into the reactor 20 under the inert atmosphere. Additionally, the lithium metal feeder 60 is provided with a second heating unit (not shown) and a thermocouple 61, so melting lithium solid to feed molten lithium into the reactor 20. In other words, the lithium solid is weighed under the inert atmosphere in a glove box and charged through a lithium inlet port 63 into the lithium metal feeder 60. Subsequently, the lithium metal feeder 60 is pulled from the glove box, and combined with the sealing lid 35. The lithium solid is then molten using the second heating unit in the lithium metal feeder 60, and then fed into the reactor 20.

As described above, the porous filter 40 is mounted on the bottom of the reactor 20 using a filter adaptor 45, and functions to filter the resulting product discharged from the reactor to separate the uranium metal powder from the molten salt when the valve 39 ascends to open the discharging valve hole 21 of the reaction vessel 25. In this regard, The filter 40 is made of porous magnesia of which average pore size is about 10 $\mu$m, having excellent corrosive resistance and heat stability against the high temperature molten salt. Additionally, the filter 40 forms a tub having lateral walls and a bottom.

The molten salt recovery tank 50 is located under a lower part of the porous filter 40 to store the molten salt passing through the porous filter 40.

As well, a sample inlet port 11 for feeding uranium oxide and lithium chloride into the reactor 20 is installed on the sealing lid 35, and a thermocouple 15 and a manometer 17 are installed through the sealing lid so as to measure temperature and pressure in the reactor 20.

Additionally, the heating furnace 10 may further comprise a sub-tank 70 positioned between an inner surface of the heating furnace 10 and outer surfaces of the reactor 20 and molten salt recovery tank 50. The sub-tank 70 functions to prevent the molten salt leaked from the molten salt recovery tank 50 from contaminating the inner surface of the heating furnace 10 when the molten salt stored in the molten salt recovery tank 50 leaks.

Hereinafter, a description will be given of the procedure of metallizing uranium oxide and recovering uranium metal powder using a filter.

A predetermined amount of lithium chloride and uranium oxide powder are fed through the sample inlet port 11 into the reactor 20, and lithium chloride is molten in the reactor 20 by heating the reactor 20 using the first heating units to 650° C. When the inside of the reactor 20 is heated to 600° C., argon gas is continuously fed through the argon gas inlet port 46 into the reactor 20 and discharged through the argon gas outlet port 47, thereby removing moisture contained in air and lithium chloride to allow the inside of the reactor 20 to be under the inert atmosphere.

After the inside of the reactor 20 is heated to at 650° C. and lithium chloride is molten, the molten lithium metal is fed through the lithium metal feeder 60 into the reactor 20 and uranium oxide is reduced by lithium while the agitation by a pair of agitators 30 each rotating at a speed of 250 rpm.

The lithium metal is fed through the lithium metal feeder 60 into the reactor 20 by 50% of the total feeding amount of the lithium metal at the beginning of the reduction of the lithium metal, and further fed into the reactor 20 by 10% of the total feeding amount every 2 hours. If the lithium metal is excessively fed into the reactor 20, the non-dissolved lithium metal floats on the upper part of the liquid lithium chloride molten salt because the solubility of the lithium metal against the lithium chloride molten salt is very low (0.5 mol % at 650° C.) and the density of the lithium metal (0.511 g/cm$^3$) is much lower than that of the lithium chloride molten salt. Thus, the gasified lithium metal is readily leaked outside the reactor 20. For this reason, all the lithium metal is not fed into the reactor 20 at once, but fed into the reactor 20 little by little in time.

As described above, argon gas continuously flows throughout the reactor 20 while the inside of the reactor 20 and an agitation speed are maintained at 650° C. and 250 rpm, respectively, thereby maintaining the inert atmosphere in the reactor 20.

It takes 10 hours to metallize uranium oxide, and after the completion of the metallization, the valve 39 ascends by the pneumatic cylinder actuator 37 to open the discharging valve hole 21 of the reaction vessel 25. The uranium metal powder and liquid molten salt are discharged to the porous filter 40 made of magnesia positioned under the discharging valve hole 21 and then filtered.

After filtration, a power source connected to the heating furnace 10 is turned off, the heating furnace is cooled to room temperature, and the reactor 20 and porous filter 40 are separated from the heating furnace 10 to recover the filtered uranium metal powder and the molten salt collected in the molten salt recovery tank 50, thereby accomplishing the metallization of uranium oxide and the recovering of the uranium metal powder.

As described above, the present invention provides a device for metallizing uranium oxide and recovering uranium, which metallizes uranium oxide to a uranium metal by reacting uranium oxide with lithium in a high temperature molten salt, and recovers the uranium metal. Therefore, the device according to the present invention is advantageous in that the reduction time of uranium oxide is shortened and reduction efficiency is improved because fine uranium oxide powder is used as a reactant, thereby being effectively applied to reduce a spent nuclear fuel mostly consisting of uranium oxide to the uranium metal.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A device for metallizing uranium oxide and recovering uranium, comprising:

a heating furnace including at least one first heating unit for allowing the reaction vessel to be maintained at a high temperature;

a reactor including a reaction vessel having an discharging valve hole located at a center of a bottom thereof and a conical bottom tapered to the discharging valve hole, a sealing lid for sealing the reaction vessel airtight, an argon gas inlet port for feeding argon gas into the reactor therethrough, and an argon gas outlet port for venting argon gas from the reactor therethrough;

a valve assembly for controlling the discharging valve hole of the reaction vessel;

a plurality of agitators for uniformly mixing a mixture in the reactor;

a lithium metal feeder including a second heating unit and removably installed through the sealing lid to feed molten lithium metal into the reactor;

a cooling jacket set in the sealing lid to allow compressed air to continuously flow therethrough to intercept heat from the reactor;

a porous filter located under the reactor in the heating furnace to filter a resulting product discharged from the reactor; and a molten salt recovery tank positioned under the porous filter in the heating furnace to collect molten salt passing through the porous filter, wherein the heating furnace includes therein a plurality of first heating units independently controlled in terms of temperature and vertically spaced apart from each other at predetermined intervals.

2. The device as set forth in claim 1, wherein the porous filter is made of magnesia to filter fine uranium metal powder discharged from the reactor.

3. A device for metallizing uranium oxide and recovering uranium, comprising:

a heating furnace including at least one first heating unit for allowing the reaction vessel to be maintained at a high temperature;

a reactor including a reaction vessel having an discharging valve hole located at a center of a bottom thereof and a conical bottom tapered to the discharging valve hole, a sealing lid for sealing the reaction vessel airtight, an argon gas inlet port for feeding argon gas into the reactor ther, and an argon gas outlet port for venting argon gas from the reactor therethrough;

a valve assembly for controlling the discharging valve hole of the reaction vessel;

a plurality of agitators for uniformly mixing a mixture in the reactor;

a lithium metal feeder including a second heating unit and removably installed through the sealing lid to feed molten lithium metal into the reactor;

a cooling jacket set in the sealing lid to allow compressed air to continuously flow therethrough to intercept heat from the reactor;

a porous filter located under the reactor in the heating furnace to filter a resulting product discharged from the reactor; and a molten salt recovery tank positioned under the porous filter in the heating furnace to collect molten salt passing through the porous filter, wherein the valve assembly comprises a pneumatic cylinder actuator provided at the sealing lid, and a rod-shaped valve connected to an output end of the pneumatic cylinder actuator to control the discharging valve hole.

4. The device as set forth in claim 1, wherein the agitators comprise two agitators located at diametrically opposite sides around the center of the reactor.

5. A device for metallizing uranium oxide and recovering uranium, comprising:

a heating furnace including at least one first heating unit for allowing the reaction vessel to be maintained at a high temperature;

a reactor including a reaction vessel having an discharging valve hole located at a center of a bottom thereof and a conical bottom tapered to the discharging valve hole, a sealing lid for sealing the reaction vessel airtight, an argon gas inlet port for feeding argon gas into the reactor therethrough, and an argon gas outlet port for venting argon gas from the reactor therethrough;

a valve assembly for controlling the discharging valve hole of the reaction vessel;

a plurality of agitators for uniformly mixing a mixture in the reactor;

a lithium metal feeder including a second heating unit and removably installed through the sealing lid to feed molten lithium metal into the reactor;

a cooling jacket set in the sealing lid to allow compressed air to continuously flow therethrough to intercept heat from the reactor;

a porous filter located under the reactor in the heating furnace to filter a resulting product discharged from the reactor; and a molten salt recovery tank positioned under the porous filter in the heating furnace to collect molten salt passing through the porous filter, wherein each of the agitators comprises a magnetic drive unit, a motor positioned outside the reactor, and a drive shaft positioned in the reactor, said magnetic drive unit transporting power from the motor to the drive shaft while sealing the reactor airtight.

6. A device for metallizing uranium oxide and recovering uranium, comprising:

a heating furnace including at least one first heating unit for allowing the reaction vessel to be maintained at a high temperature;

a reactor including a reaction vessel having an discharging valve hole located at a center of a bottom thereof and a conical bottom tapered to the discharging valve hole, a sealing lid for sealing the reaction vessel airtight, an argon gas inlet port for feeding argon gas into the reactor therethrough, and an argon gas outlet port for venting argon gas from the reactor therethrough;

a valve assembly for controlling the discharging valve hole of the reaction vessel;

a plurality of agitators for uniformly mixing a mixture in the reactor;

a lithium metal feeder including a second heating unit and removably installed through the sealing lid to feed molten lithium metal into the reactor;

a cooling jacket set in the sealing lid to allow compressed air to continuously flow therethrough to intercept heat from the reactor;

a porous filter located under the reactor in the heating furnace to filter a resulting product discharged from the reactor;

a molten salt recovery tank positioned under the porous filter in the heating furnace to collect molten salt passing through the porous filter; and a sub-tank located between an inner surface of the heating furnace and outer surfaces of the reactor and molten salt recovery tank.

7. The device as set forth in claim 4, wherein each of the agitators comprises a magnetic drive unit, a motor positioned outside the reactor, and a drive shaft positioned in the reactor, said magnetic drive unit transporting power from the motor to the drive shaft while sealing the reactor airtight.

* * * * *

UNITED STATES PATENT AND TRADEMARK OFFICE
CERTIFICATE OF CORRECTION

PATENT NO. : 6,972,108 B2 Page 1 of 1
DATED : December 6, 2005
INVENTOR(S) : Ik-Soo Kim et al.

It is certified that error appears in the above-identified patent and that said Letters Patent is hereby corrected as shown below:

Column 7,
Line 36, "ther" should read -- therethrough --.

Signed and Sealed this

Seventh Day of March, 2006

JON W. DUDAS
*Director of the United States Patent and Trademark Office*